(12) United States Patent
Chuang (10) Patent No.: US 11,932,342 B2
(45) Date of Patent: Mar. 19, 2024

(54) TAILLIGHT ASSEMBLY OF A BICYCLE

(71) Applicant: Cheng Uei Precision Industry Co., Ltd., New Taipei (TW)

(72) Inventor: Yung Cheng Chuang, New Taipei (TW)

(73) Assignee: Cheng Uei Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 18/196,697

(22) Filed: May 12, 2023

(65) Prior Publication Data

US 2024/0059366 A1  Feb. 22, 2024

Related U.S. Application Data

(60) Provisional application No. 63/399,766, filed on Aug. 22, 2022.

(51) Int. Cl.

| *B62J 6/04* | (2020.01) |
| *B62J 1/08* | (2006.01) |
| *B62J 6/01* | (2020.01) |
| *F21W 107/13* | (2018.01) |

(52) U.S. Cl.
CPC . *B62J 6/04* (2013.01); *B62J 1/08* (2013.01); *B62J 6/01* (2020.02); *F21W 2107/13* (2018.01)

(58) Field of Classification Search
CPC ......... B62J 6/04; B62J 6/01; B62J 1/08; B62J 6/00; F21W 2107/13; F21V 19/00; F21V 19/003; F21V 21/00; F21V 21/088; F21V 21/0885; F21V 33/00
See application file for complete search history.

(56) References Cited

U.S. PATENT DOCUMENTS

| 3,753,000 | A | * | 8/1973 | Newman | B62J 6/015 362/183 |
| 3,792,307 | A | * | 2/1974 | Baker | B62J 6/015 315/86 |
| 5,457,612 | A | * | 10/1995 | Carter | B62J 6/16 362/249.05 |
| 5,842,714 | A | * | 12/1998 | Spector | B62K 19/30 280/288.4 |
| 9,168,964 | B1 | * | 10/2015 | Lee | B62J 6/06 |
| 11,173,977 | B1 | * | 11/2021 | Chen | B62J 6/057 |
| 2015/0197299 | A1 | * | 7/2015 | Lee | B62J 6/04 280/288.4 |
| 2016/0014377 | A1 | * | 1/2016 | Fiegert | F16M 13/02 348/148 |

(Continued)

*Primary Examiner* — Bao Q Truong
(74) *Attorney, Agent, or Firm* — Lin & Associates Intellectual Property, Inc.

(57) ABSTRACT

A taillight assembly of a bicycle includes a seat, a seat tube and a clamping element. A bottom of the seat is provided with a seat post. An inside of the seat tube defines an inner space for holding the seat post. A rear of the seat tube defines a wire slot which is disposed for holding a signal wire. The clamping element is fastened to a top of the seat tube. The clamping element includes a taillight fastener, a taillight unit and a wire tunnel. The taillight unit has an indicator surface and an assembling surface. The assembling surface is combined with the taillight fastener. An inside of the clamping element defines the wire tunnel. The wire tunnel is connected to the wire slot. The signal wire passes through the wire tunnel, and then the signal wire enters the wire slot.

9 Claims, 8 Drawing Sheets

(56) References Cited

U.S. PATENT DOCUMENTS

2018/0111654 A1\* 4/2018 Emerson .................... B62J 6/03
2018/0170469 A1\* 6/2018 Zheng ..................... G01S 19/19
2020/0189678 A1\* 6/2020 Phillip .................... B62J 6/045

\* cited by examiner

TAILLIGHT ASSEMBLY OF A BICYCLE

CROSS-REFERENCE TO RELATED APPLICATION

This application claims the priorities of U.S. provisional patent application No. 63/399,766, filed on Aug. 22, 2022, which is incorporated herewith by reference.

BACKGROUND OF THE INVENTION

1. Field of the Invention

The present invention generally relates to a bicycle taillight, and more particularly to a taillight assembly of a bicycle which has a hidden wiring.

2. The Related Art

With the popularity of bicycle sports in recent years, bicycle-related accessories are developed prosperously. In order to further promote a riding safety and a comfortability of a cyclist, accessories for providing instructions, such as direction lights or brake lights, are gradually installed to bikes, so that a taillight assembly of a bicycle can not only indicates a position of the bicycle for a rear vehicle when weather is bad or sky is dark, but also further informs turning or braking information to the rear vehicle. As a result, a traffic safety is further improved.

However, when the bicycle turns or brakes, in order to make the taillight assembly of the bicycle shine a corresponding light, the taillight assembly needs to be wired to a light switch for a rider to activate a braking light or a turning light, or an automatic controller which detects a riding status and controls the taillight according to the riding status automatically. However, the taillight assemblies currently on the market are usually unintegrated with a frame of the bicycle, and signal wires used to control the taillight assembly of the bicycle are often exposed to an external surface of the frame of the bicycle. Therefore, a weather resistance of the taillight assembly of the bicycle is poorer, and when the rider rides the bicycle, the signal wires are easy to be pulled by a mistaken touching, so a trouble is brought to the rider.

In view of the above-mentioned problems, it is necessary to provide a taillight assembly of a bicycle which has a hidden wiring.

SUMMARY OF THE INVENTION

An object of the present invention is to provide a taillight assembly of a bicycle which has a hidden wiring. The taillight assembly of the bicycle includes a seat, a seat tube and a clamping element. A bottom of the seat is provided with a seat post. An inside of the seat tube defines an inner space penetrating through a top surface of the seat tube for holding the seat post. A rear of the seat tube defines a wire slot penetrating through the top surface of the seat tube. The wire slot is located behind the inner space. The wire slot is disposed for holding a signal wire. The clamping element is fastened to a top of the seat tube. The clamping element includes a taillight fastener, a taillight unit and a wire tunnel. The taillight fastener is disposed at a rear of the clamping element. The taillight unit has an indicator surface, and an assembling surface connected with the signal wire. The assembling surface is combined with the taillight fastener. The assembling surface is connected with the taillight fastener. An inside of the clamping element defines the wire tunnel. One end of the wire tunnel penetrates through the taillight fastener along a front-to-rear direction. The other end of the wire tunnel penetrates through the clamping element along the front-to-rear direction, then extends downward and further penetrates through a bottom surface of the clamping element. A bottom end of the wire tunnel is connected to a top end of the wire slot. The signal wire is extended from the assembling surface of the taillight unit. The signal wire passes through the wire tunnel, and then the signal wire enters the wire slot.

Another object of the present invention is to provide a taillight assembly of a bicycle. The taillight assembly of the bicycle includes a frame, a seat, and a clamping element. The frame includes a seat tube. An inside of the seat tube defines an inner space penetrating through a top surface of the seat tube. A rear of the seat tube defines a wire slot penetrating through the top surface of the seat tube. The wire slot is located behind the inner space. The seat is fixed to the seat tube. A bottom of the seat is provided with a seat post. The seat post is disposed in the inner space. The clamping element is fastened to a top of the seat tube. The clamping element includes a taillight fastener disposed at a rear of the clamping element, a taillight unit, a wire tunnel, a guiding hole, a fastening screw and a signal wire. The taillight unit has an indicator surface, and an assembling surface. The assembling surface is combined with the taillight fastener. The assembling surface is connected with the taillight fastener. A front of the taillight unit defines a screw hole penetrating through the assembling surface of the taillight unit. An inside of the clamping element defines the wire tunnel. One end of the wire tunnel penetrates through the taillight fastener along a front-to-rear direction. The other end of the wire tunnel penetrates through the clamping element along the front-to-rear direction, then extends downward and further penetrates through a bottom surface of the clamping element. A bottom end of the wire tunnel is connected to a top end of the wire slot. The guiding hole penetrate s through the clamping element along the front-to-rear direction. The guiding hole is corresponding to the screw hole. The fastening screw passes through the guiding hole, and then the fastening screw is fastened to the screw hole. The signal wire is disposed to the assembling surface of the taillight unit. The signal wire passes through the wire tunnel, and then the signal wire enters the wire slot, the signal wire is hidden in the wire slot of the frame.

Another object of the present invention is to provide a taillight assembly of a bicycle. The taillight assembly of the bicycle includes a frame, a seat, and a clamping element. The frame includes a seat tube. An inside of the seat tube defines an inner space penetrating through a top surface of the seat tube. A rear of the seat tube defines a wire slot penetrating through the top surface of the seat tube. The wire slot is located behind the inner space. The seat is fixed to the seat tube. A bottom of the seat is provided with a seat post. The seat post is disposed in the inner space. The clamping element is fastened to a top of the seat tube. The clamping element includes a taillight fastener, a taillight unit, a wire tunnel, two clamping arms disposed at a front of the clamping element, a clamping hole and a signal wire. The taillight fastener is disposed at a rear of the clamping element. A top of a rear surface of the taillight fastener is recessed inward to form an assembling space. The taillight unit has an indicator surface, and an assembling surface. The assembling surface is combined with the taillight fastener. The assembling surface is connected with the taillight fastener. The assembling surface is accommodated in the assembling space. The inside of the clamping element defines the wire tunnel. One end of the wire tunnel penetrates through the taillight fastener along a front-to-rear direction. The other end of the wire tunnel penetrates through the clamping element along the front-to-rear direction, then extends downward and further penetrates through a bottom surface of the clamping element. A bottom end of the wire tunnel is connected to a top end of the wire slot. The seat post is clamped between the two clamping arms. The clamping hole is formed between the two clamping arms. The seat post is inserted into the clamping hole. The signal wire is disposed to the assembling surface of the taillight unit. The signal wire passes through the wire tunnel, and then the signal wire enters the wire slot, the signal wire is hidden in the wire slot of the frame.

As described above, the inner space is formed in the seat tube for holding the seat post, the rear of the seat tube defines the wire slot penetrating through the top surface of the seat tube, the clamping element has the taillight fastener disposed at the rear of the clamping element, the inside of the clamping element defines the wire tunnel, the one end of the wire tunnel penetrates through the taillight fastener along the front-to-rear direction, the other end of the wire tunnel penetrates through a base portion of the clamping element along the front-to-rear direction, then extends downward and further penetrates through a bottom surface of the base portion of the clamping element. The bottom end of the wire tunnel is connected to the top end of the wire slot. The signal wire of the taillight unit of the taillight assembly of the bicycle passes through the wire tunnel and is hidden in the wire slot of the frame, so the taillight assembly of the bicycle has the hidden wiring.

BRIEF DESCRIPTION OF THE DRAWINGS

The present invention will be apparent to those skilled in the art by reading the following description, with reference to the attached drawings, in which.

DETAILED DESCRIPTION OF THE PREFERRED EMBODIMENT

Figure 1:
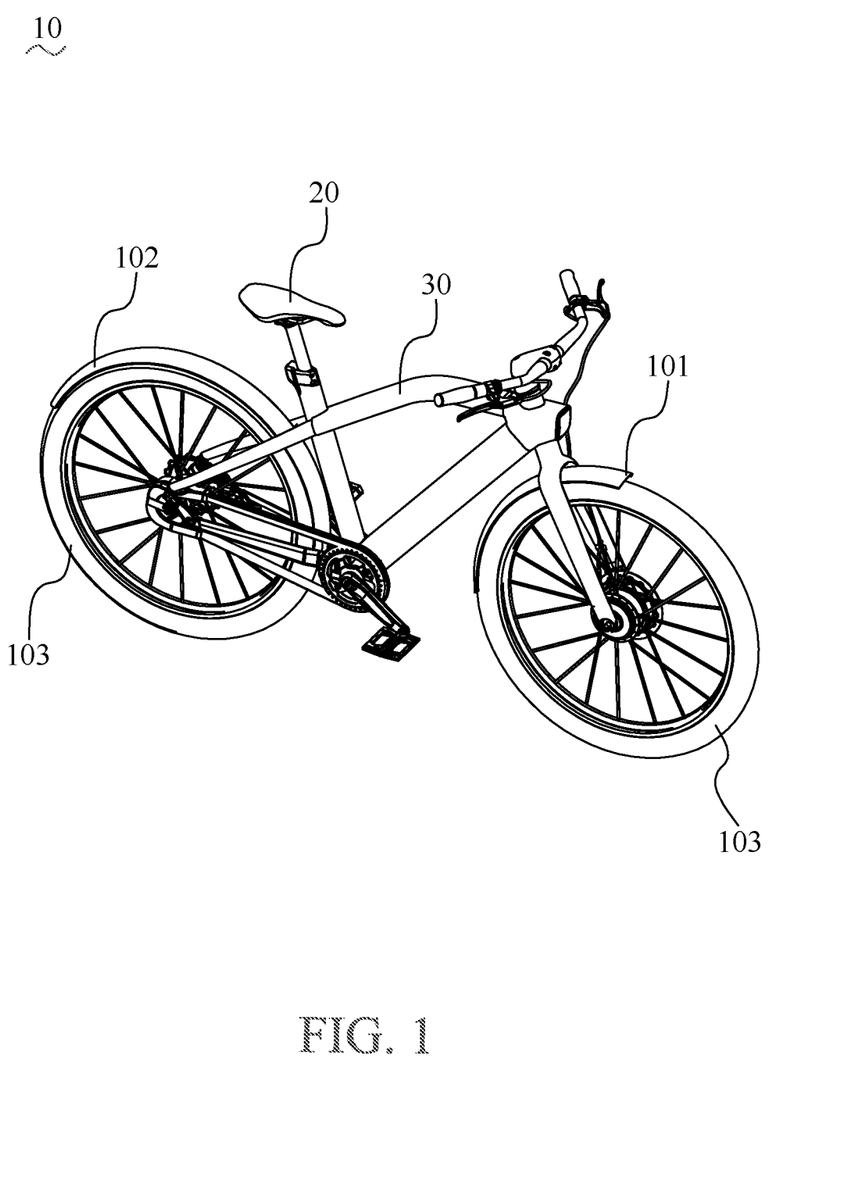
FIG. 1 is a perspective view of a bicycle in accordance with a preferred embodiment of the present invention.
Figure 2:
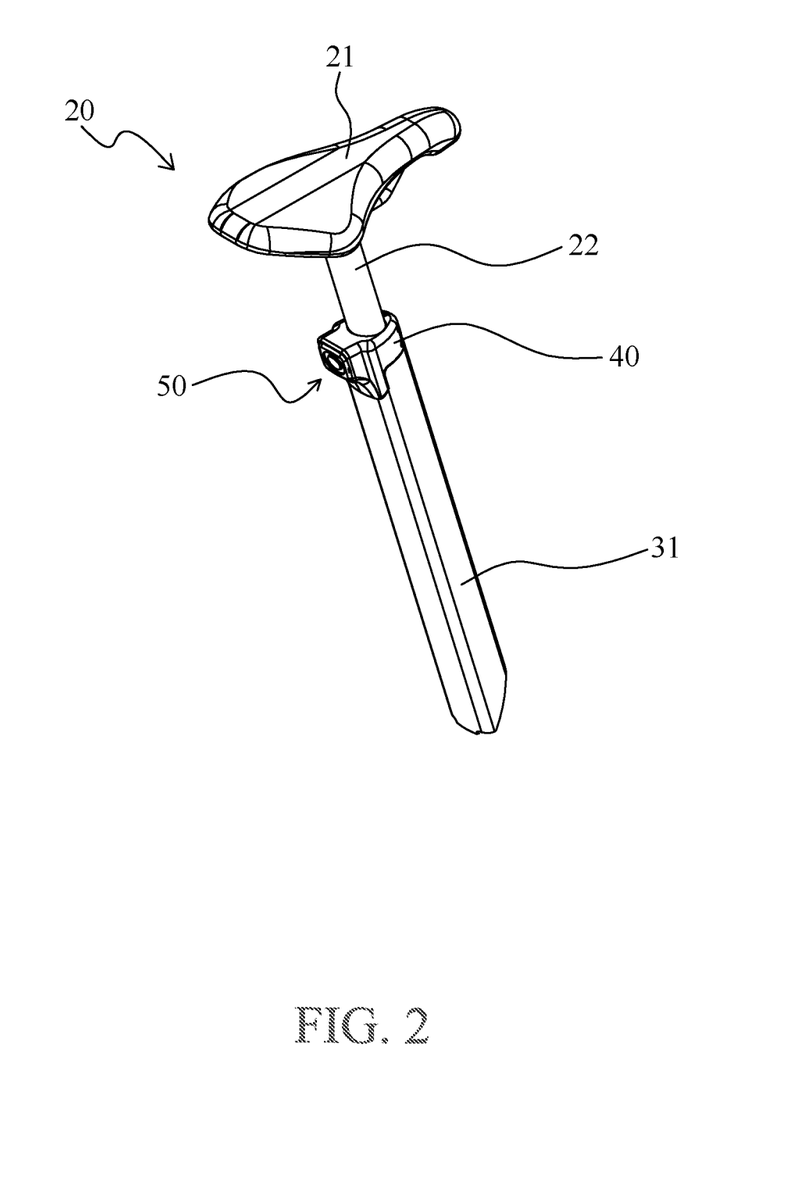
FIG. 2 is a perspective view of a taillight assembly of the bicycle in accordance with the preferred embodiment of the present invention.
Figure 3:
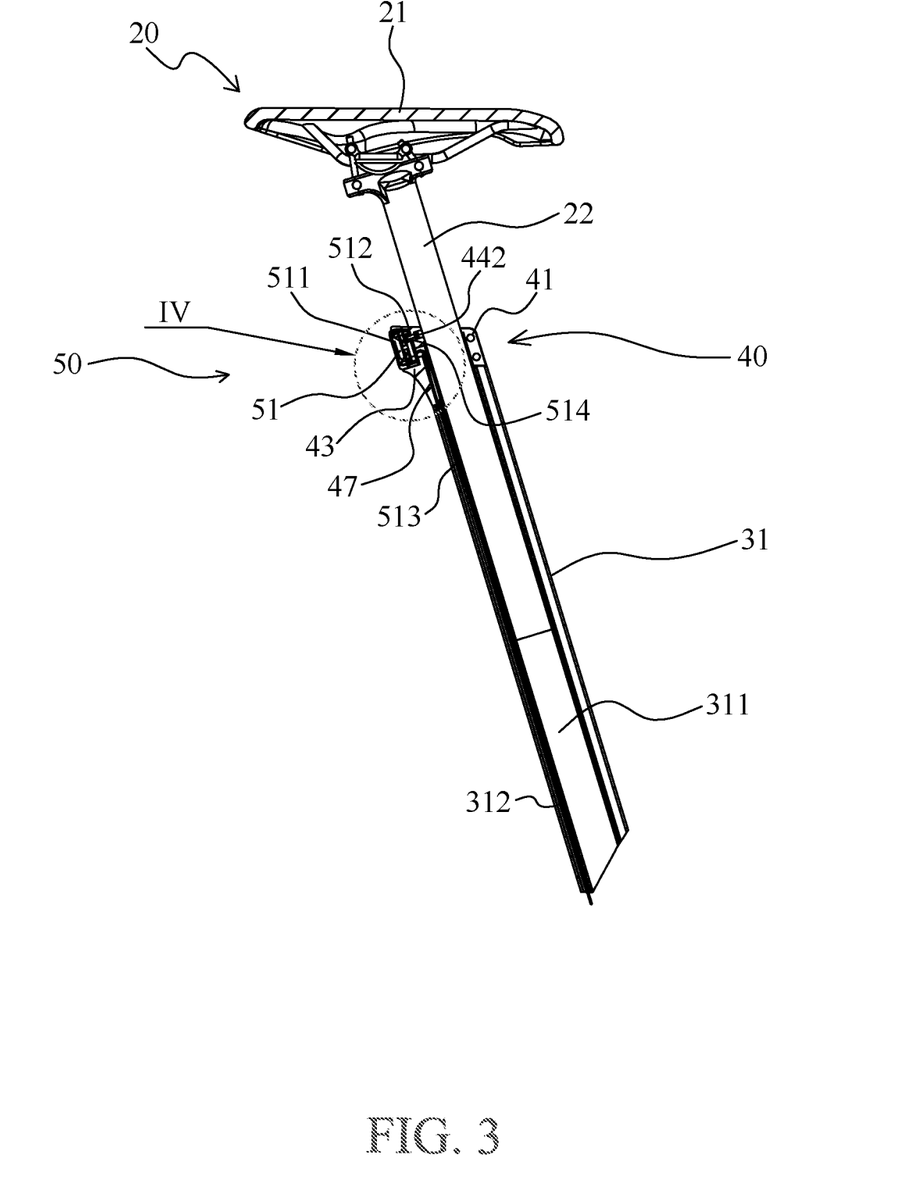
FIG. 3 is a cross-sectional view of the taillight assembly of the bicycle in accordance with the preferred embodiment of the present invention.
Figure 4:
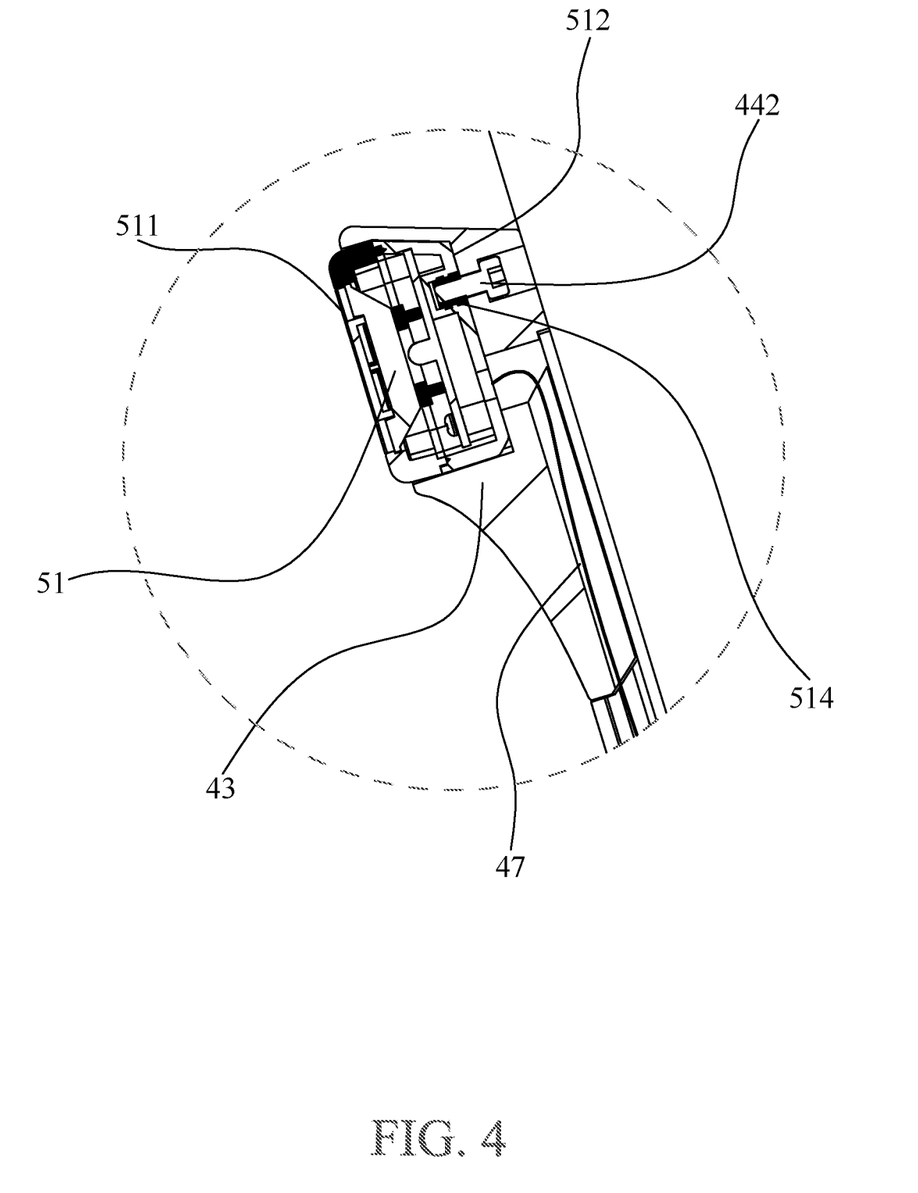
FIG. 4 is an enlarged view of an encircled portion IV of the taillight assembly of the bicycle of FIG. 3.
Figure 5:
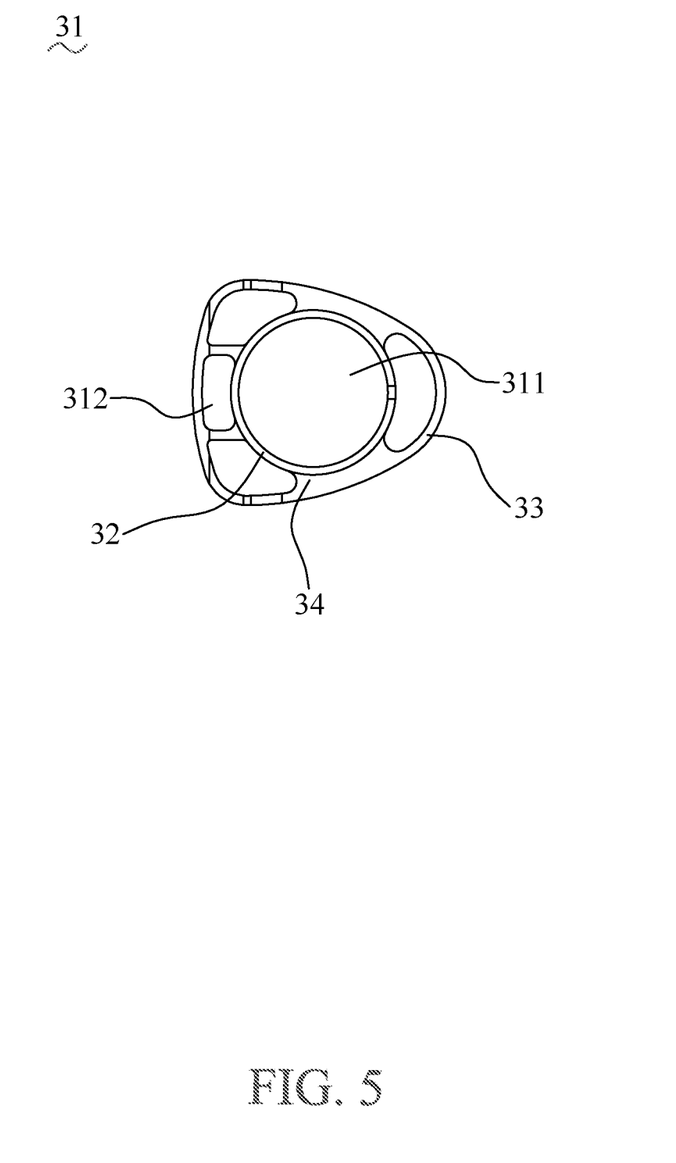
FIG. 5 is a cross-sectional view of a seat tube of the bicycle in accordance with the preferred embodiment of the present invention.
Figure 6:
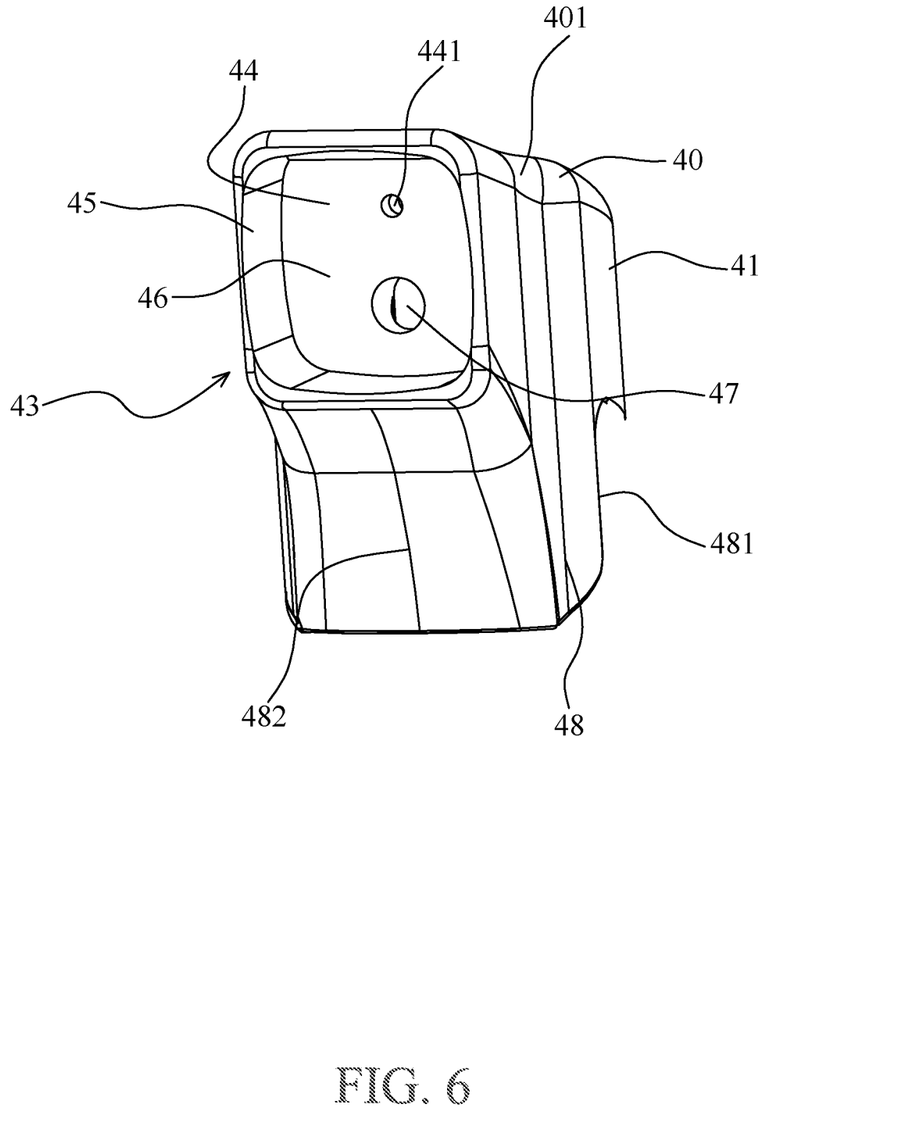
FIG. 6 is a perspective view of a clamping element in accordance with the preferred embodiment of the present invention.
Figure 7:
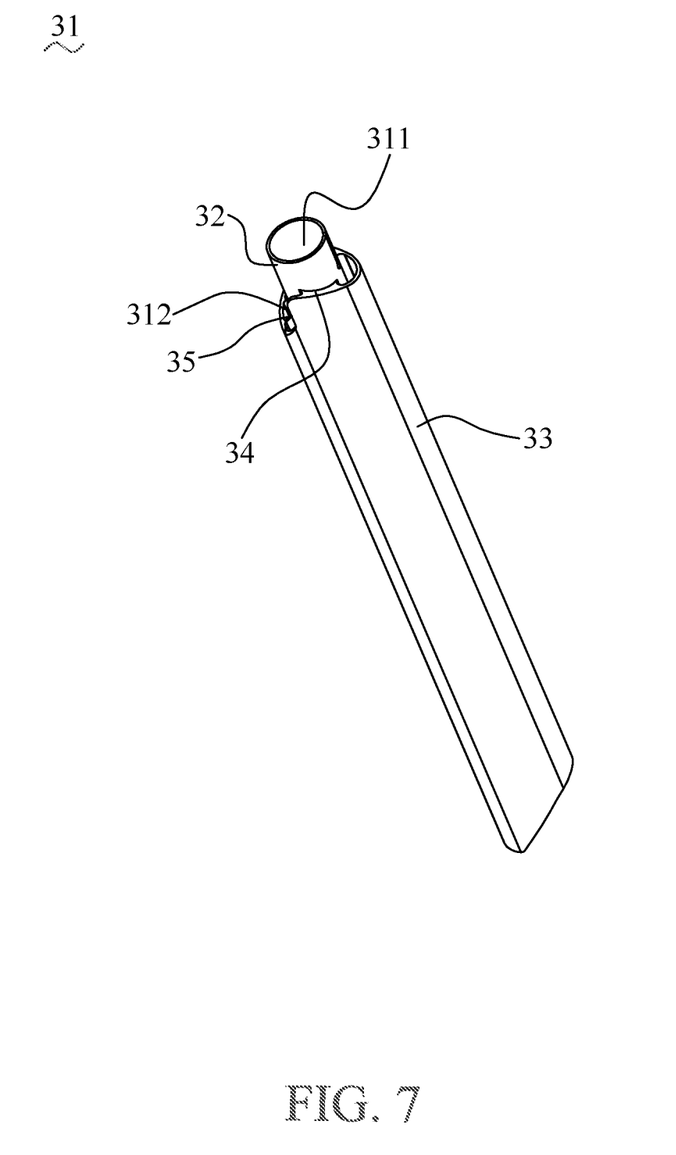
FIG. 7 is a perspective view of the seat tube of the bicycle in accordance with the preferred embodiment of the present invention.
Figure 8:
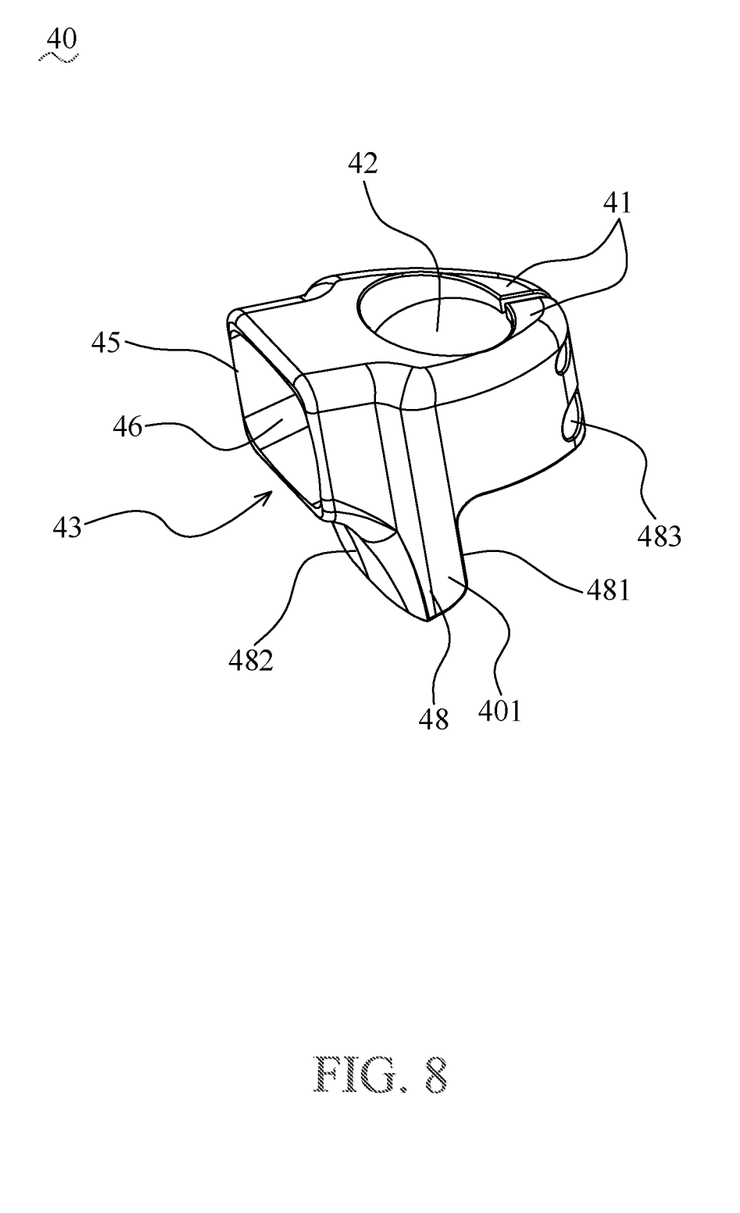
FIG. 8 is another perspective view of the clamping element in accordance with the preferred embodiment of the present invention.

Referring to FIG. 1 and FIG. 2, a taillight assembly 50 of a bicycle 10 in accordance with a preferred embodiment of the present invention is shown. The bicycle 10 includes a head end 101, a trailing end 102, two wheels 103, a seat 20, a frame 30 and the taillight assembly 50. The head end 101 is opposite to the trailing end 102. The seat 20 is opposite to the two wheels 103. The seat 20 is located between the head end 101 and the trailing end 102. In order to describe more conveniently, the head end 101 is defined as a front of the bicycle 10. The trailing end 102 is defined as a rear of the bicycle 10 opposite to the front of the bicycle 10. The seat 20 of the bicycle 10 is defined as a top of the bicycle 10. A position of each wheel 103 towards a ground is defined as a bottom of the bicycle 10.

The seat 20 includes a saddle 21 and a seat post 22 assembled under the saddle 21. A bottom of the seat 20 is provided with the seat post 22. The seat post 22 is connected with a bottom of the saddle 21. The frame 30 includes a seat tube 31 and a clamping element 40 fastened to a top of the seat tube 31. The seat post 22 is inserted into the seat tube 31, and then the seat post 22 is clamped by the clamping element 40, so that the seat 20 is securely fixed to the seat tube 31 of the frame 30.

Referring to FIG. 3 to FIG. 8, the taillight assembly 50 of the bicycle 10 includes the seat 20, the seat tube 31 of the frame 30, the clamping element 40 and a taillight unit 51. The seat tube 31 is hollow. The taillight assembly 50 includes a signal wire 513 disposed to the taillight unit 51. In order to hide the signal wire 513 of the taillight unit 51 in the frame 30, the taillight assembly 50 further has an inner space 311 and a wire slot 312. An inside of the seat tube 31 defines the inner space 311 penetrating through a top surface of the seat tube 31 for holding the seat post 22. The seat post 22 is disposed in the inner space 311. A rear of the seat tube 31 defines a wire slot 312 penetrating through the top surface of the seat tube 31. The wire slot 312 is located behind the inner space 311. The wire slot 312 is disposed for holding the signal wire 513.

The clamping element 40 has two clamping arms 41 disposed at a front of the clamping element 40, a taillight fastener 43 disposed at a rear of the clamping element 40, and a base portion 401 located between the two clamping arms 41 and the taillight fastener 43. Two opposite sides of the base portion 401 are arched frontward and outward to form two clamping arms 41. Two free end surfaces of the two clamping arms 41 are disposed face to face. The clamping element 40 has a clamping hole 42 formed between the two clamping arms 41. The seat post 22 is inserted into the clamping hole 42. The seat post 22 is clamped between the two clamping arms 41. The taillight fastener 43 is protruded rearward from a rear of the base portion 401. The taillight fastener 43 is connected to the two clamping arms 41. Two fronts of the two clamping arms 41 define a plurality of fixing holes 483. The taillight assembly 50 of the bicycle 10 further includes a plurality of fixing screws (not shown). The plurality of the fixing screws are fixed in the plurality of the fixing holes 483, so the clamping element 40 is fixed to the top of the seat tube 31.

The taillight unit 51 has an indicator surface 511 with a visual indicating element, and an assembling surface 512 connected with the signal wire 513. The signal wire 513 is disposed to the assembling surface 512 of the taillight unit 51. The assembling surface 512 is assembled with the taillight fastener 43. The assembling surface 512 is combined with the taillight fastener 43. An inside of the clamping element 40 defines a wire tunnel 47. One end of the wire tunnel 47 penetrates through the taillight fastener 43 along a front-to-rear direction. The other end of the wire tunnel 47 penetrates through the clamping element 40 along the front-to-rear direction, then extends downward and further penetrates through a bottom surface of the clamping element 40.

Specifically, the other end of the wire tunnel 47 penetrates through the base portion 401 of the clamping element 40 along the front-to-rear direction, then extends downward and further penetrates through a bottom surface of the base portion 401 of the clamping element 40. A bottom end of the wire tunnel 47 is connected to a top end of the wire slot 312. The clamping element 40 has a guiding hole 441 penetrating through the clamping element 40 along the front-to-rear direction. The inside of the clamping element 40 defines the guiding hole 441 penetrating through the taillight fastener 43 and the base portion 401 along the front-to-rear direction. The guiding hole 441 is corresponding to a screw hole 514 of the taillight unit 51.

Referring to FIG. 1 to FIG. 8, in order to securely combine the taillight unit 51 with the taillight fastener 43, the taillight fastener 43 further includes an isolating wall 44 connected with the base portion 401 and the two clamping arms 41, and a ring wall 45 extended rearward from a periphery of the isolating wall 44. A top of a rear surface of the taillight fastener 43 is recessed inward to form an assembling space 46. The isolating wall 44 and the ring wall 45 together surround the assembling space 46 between the ring wall 45 and the isolating wall 44. The wire tunnel 47 and the guiding hole 441 penetrate through the isolating wall 44 of the taillight fastener 43 and the base portion 401. The wire tunnel 47 and the guiding hole 441 are connected between the assembling space 46 and the clamping hole 42.

A front of the taillight unit 51 defines the screw hole 514 penetrating through the assembling surface 512 of the taillight unit 51. The front of the taillight unit 51 is assembled in the assembling space 46. The assembling surface 512 of the taillight unit 51 is accommodated in the assembling space 46. The indicator surface 511 is exposed outside. The taillight assembly 50 further includes a fastening screw 442. The fastening screw 442 passes through the guiding hole 441, and then the fastening screw 442 is fastened to the screw hole 514 for fastening the taillight unit 51 to the taillight fastener 43.

The signal wire 513 is slantwise extended frontward and upward, and then is slantwise extended frontward and downward from the assembling surface 512 of the taillight unit 51, the signal wire 513 of the taillight unit 51 of the taillight assembly 50 of the bicycle 10 passes through the wire tunnel 47, and then the signal wire 513 enters the wire slot 312. The signal wire 513 is hidden in the wire slot 312 of the frame 30, so that the signal wire 513 is prevented from being exposed to wind and rain or being mistakenly touched and inadvertently pulled during riding the bicycle 10.

Referring to FIG. 1 to FIG. 8, in this preferred embodiment, the inside of the seat tube 31 includes an inner tube 32. The inner space 311 is formed in the inner tube 32. An outside of the inner tube 32 has an outer tube 33 surrounding the inner tube 32. The outer tube 33 is a special-shaped tube. A front of a sectional surface of the outer tube 33 is a conical arc shape, and a rear of the sectional surface of the outer tube 33 is a flat shape. The seat tube 31 has a plurality of connecting ribs 34 connected between the inner tube 32 and the outer tube 33. A height of the inner tube 32 is higher than a height of the outer tube 33, so that the inner tube 32 projects beyond a top of the outer tube 33 of the seat tube 31. A top edge of a rear wall of the outer tube 33 is recessed downward to form an insertion groove 35. A bottom of a middle of the taillight fastener 43 is defined as an insertion portion 48. Specifically, a bottom of the base portion 401 which is arranged at the bottom of the middle of the taillight fastener 43 is defined as the insertion portion 48. The insertion portion 48 is matched with the insertion groove 35.

The insertion portion 48 is assembled with the insertion groove 35. The insertion portion 48 is inserted into the insertion groove 35.

In this preferred embodiment, the insertion groove 35 is cut downward into the outer tube 33 from the top of the outer tube 33. The insertion groove 35 extends along a direction parallel to the wire slot 312. A front of the insertion portion 48 has an embedding wall 481 parallel to the wire slot 312, so when the clamping element 40 is combined with the seat tube 31, the embedding wall 481 of the insertion portion 48 is embedded with the insertion groove 35 of the outer tube 33 to avoid the clamping element 40 from deflecting. A lower surface of the insertion portion 48 is defined as a curved transition surface 482. The curved transition surface 482 is connected with a rear surface of the taillight fastener 43 and a rear surface of the outer tube 33 to reduce a surface convex.

As described above, the inner space 311 is formed in the seat tube 31 for holding the seat post 22, the rear of the seat tube 31 defines the wire slot 312 penetrating through the top surface of the seat tube 31, the clamping element 40 has the taillight fastener 43 disposed at the rear of the clamping element 40, the inside of the clamping element 40 defines the wire tunnel 47, the one end of the wire tunnel 47 penetrates through the taillight fastener 43 along the front-to-rear direction, the other end of the wire tunnel 47 penetrates through the base portion 401 of the clamping element 40 along the front-to-rear direction, then extends downward and further penetrates through the bottom surface of the base portion 401 of the clamping element 40. The bottom end of the wire tunnel 47 is connected to the top end of the wire slot 312. The signal wire 513 of the taillight unit 51 of the taillight assembly 50 of the bicycle 10 passes through the wire tunnel 47 and is hidden in the wire slot 312 of the frame 30, so the taillight assembly 50 of the bicycle 10 has a hidden wiring.

What is claimed is:
1. A taillight assembly of a bicycle, comprising:
  a seat, a bottom of the seat being provided with a seat post;
  a seat tube, an inside of the seat tube defining an inner space penetrating through a top surface of the seat tube for holding the seat post, a rear of the seat tube defining a wire slot penetrating through the top surface of the seat tube, the wire slot being located behind the inner space, the wire slot being disposed for holding a signal wire; and
  a clamping element fastened to a top of the seat tube, the clamping element including
    a taillight fastener disposed at a rear of the clamping element,
    a taillight unit having an indicator surface, and an assembling surface connected with the signal wire, the assembling surface being combined with the taillight fastener, the assembling surface being connected with the taillight fastener, and
    a wire tunnel, an inside of the clamping element defining the wire tunnel, one end of the wire tunnel penetrating through the taillight fastener along a front-to-rear direction, the other end of the wire tunnel penetrating through the clamping element along the front-to-rear direction, then extending downward and further penetrating through a bottom surface of the clamping element, a bottom end of the wire tunnel being connected to a top end of the wire slot, wherein the signal wire is extended from the assembling surface of the taillight unit, the signal wire passes through the wire tunnel, and then the signal wire enters the wire slot.

2. The taillight assembly of the bicycle as claimed in claim 1, wherein the clamping element has two clamping arms disposed at a front of the clamping element, the clamping element has a clamping hole formed between the two clamping arms, the seat post is inserted into the clamping hole, the seat post is clamped between the two clamping arms.

3. The taillight assembly of the bicycle as claimed in claim 2, wherein the clamping element has a base portion located between the two clamping arms and the taillight fastener, the taillight fastener further includes an isolating wall connected with the base portion and the two clamping arms, and a ring wall extended rearward from a periphery of the isolating wall, the isolating wall and the ring wall together surround an assembling space between the ring wall and the isolating wall, the assembling surface of the taillight unit is accommodated in the assembling space.

4. The taillight assembly of the bicycle as claimed in claim 3, wherein the inside of the clamping element defines a guiding hole penetrating through the taillight fastener and the base portion along the front-to-rear direction, the wire tunnel and the guiding hole penetrate through the isolating wall of the taillight fastener and the base portion, the wire tunnel and the guiding hole are connected between the assembling space and the clamping hole, the taillight assembly includes a fastening screw, a front of the taillight unit defines a screw hole penetrating through the assembling surface of the taillight unit, the fastening screw passes through the guiding hole, and then the fastening screw is fastened to the screw hole for fastening the taillight unit to the taillight fastener.

5. The taillight assembly of the bicycle as claimed in claim 1, wherein the inside of the seat tube includes an inner tube, the inner space is formed in the inner tube, an outside of the inner tube has an outer tube surrounding the inner tube, the outer tube is a special-shaped tube, a front of a sectional surface of the outer tube is a conical arc shape, and a rear of the sectional surface of the outer tube is a flat shape, the seat tube has a plurality of connecting ribs connected between the inner tube and the outer tube.

6. The taillight assembly of the bicycle as claimed in claim 5, wherein a height of the inner tube is higher than a height of the outer tube, so that the inner tube projects beyond a top of the outer tube of the seat tube.

7. The taillight assembly of the bicycle as claimed in claim 5, wherein a top edge of a rear wall of the outer tube is recessed downward to form an insertion groove, a bottom of a middle of the taillight fastener is defined as an insertion portion, the insertion portion is matched with the insertion groove, the insertion portion is assembled with the insertion groove, the insertion portion is inserted into the insertion groove.

8. A taillight assembly of a bicycle, comprising:
a frame including a seat tube, an inside of the seat tube defining an inner space penetrating through a top surface of the seat tube, a rear of the seat tube defining a wire slot penetrating through the top surface of the seat tube, the wire slot being located behind the inner space;
a seat fixed to the seat tube, a bottom of the seat being provided with a seat post, the seat post being disposed in the inner space; and
a clamping element fastened to a top of the seat tube, the clamping element including
  a taillight fastener disposed at a rear of the clamping element,
  a taillight unit having an indicator surface, and an assembling surface, the assembling surface being combined with the taillight fastener, the assembling surface being connected with the taillight fastener, a front of the taillight unit defining a screw hole penetrating through the assembling surface of the taillight unit,
  a wire tunnel, an inside of the clamping element defining the wire tunnel, one end of the wire tunnel penetrating through the taillight fastener along a front-to-rear direction, the other end of the wire tunnel penetrating through the clamping element along the front-to-rear direction, then extending downward and further penetrating through a bottom surface of the clamping element, a bottom end of the wire tunnel being connected to a top end of the wire slot,
  a guiding hole penetrating through the clamping element along the front-to-rear direction, the guiding hole being corresponding to the screw hole,
  a fastening screw passing through the guiding hole, and then the fastening screw being fastened to the screw hole, and
  a signal wire disposed to the assembling surface of the taillight unit, the signal wire passing through the wire tunnel, and then the signal wire entering the wire slot, the signal wire being hidden in the wire slot of the frame.

9. A taillight assembly of a bicycle, comprising:
a frame including a seat tube, an inside of the seat tube defining an inner space penetrating through a top surface of the seat tube, a rear of the seat tube defining a wire slot penetrating through the top surface of the seat tube, the wire slot being located behind the inner space;
a seat fixed to the seat tube, a bottom of the seat being provided with a seat post, the seat post being disposed in the inner space; and
a clamping element fastened to a top of the seat tube, the clamping element including
  a taillight fastener disposed at a rear of the clamping element, a top of a rear surface of the taillight fastener being recessed inward to form an assembling space,
  a taillight unit having an indicator surface, and an assembling surface, the assembling surface being combined with the taillight fastener, the assembling surface being connected with the taillight fastener, the assembling surface being accommodated in the assembling space,
  a wire tunnel, an inside of the clamping element defining the wire tunnel, one end of the wire tunnel penetrating through the taillight fastener along a front-to-rear direction, the other end of the wire tunnel penetrating through the clamping element along the front-to-rear direction, then extending downward and further penetrating through a bottom surface of the clamping element, a bottom end of the wire tunnel being connected to a top end of the wire slot,
  two clamping arms disposed at a front of the clamping element, the seat post being clamped between the two clamping arms, a clamping hole formed between the two clamping arms, the seat post being inserted into the clamping hole, and a signal wire disposed to the assembling surface of the taillight unit, the signal wire passing through the wire tunnel, and then the signal wire entering the wire slot, the signal wire being hidden in the wire slot of the frame.

* * * * *